United States Patent [19]

Knutsen

[11] 3,942,771
[45] Mar. 9, 1976

[54] ARRANGEMENT IN A SILO FOR BULK MATERIAL

[76] Inventor: Roald Willies Knutsen, Stolsvigen, Hisoy, N-4800, Arendal, Norway

[22] Filed: Oct. 17, 1974

[21] Appl. No.: 515,610

[52] U.S. Cl. ............................ 259/107; 222/410
[51] Int. Cl.² ................................... B01F 7/20
[58] Field of Search ....... 259/43, 44, 164, 170, 107, 259/108; 222/410, 238

[56] References Cited
UNITED STATES PATENTS

| | | | |
|---|---|---|---|
| 1,155,712 | 10/1915 | Eirich | 259/107 |
| 1,940,138 | 12/1933 | McAdam | 222/410 X |
| 3,197,084 | 7/1965 | Lely et al. | 222/410 X |
| 3,863,815 | 2/1975 | Chaffee et al. | 222/410 X |

FOREIGN PATENTS OR APPLICATIONS

| 140,191 | 3/1920 | United Kingdom | 259/107 |
|---|---|---|---|

*Primary Examiner*—Peter Feldman
*Attorney, Agent, or Firm*—Ulle C. Linton

[57] ABSTRACT

An arrangement in a silo for bulk material, comprising a rotating agitator centrally arranged in the silo. The agitator consists of a rotatable disc equipped with at least one rigid paddle which is mounted on the disc for pivoting about an axis which is offset from the central axis of the disc. The swinging of the paddle about the offset pivot axis is effected by actuating means arranged below the disc. When the disc rotates the paddle is resiliently advanced through the material in the silo in a more or less radially extending position depending on the relation between the force imparted to the paddle by the actuating means and the reactive pressure from the contents of the silo. The paddle is pivotally mounted as a lever having two arms which are both exposed to the material in the silo. The paddle generally takes the form of an arc having a radius of curvature substantially corresponding to the distance of the axis of rotation of the disc from the pivot of the paddle, and is provided with studs or hooks along the leading edge as veiwed in the direction of advancement for improved tearing off of the bulk material in the silo.

The actuating means consists of a hydraulic cylinder which is in power transmitting connection with a first rotatable shaft on which the paddle is mounted. A second shaft which rotates the disc has a bore, which either in itself serves as or contains a conduit for pressurized fluid for communication between a stationary source of pressurized fluid and said hydraulic cylinder.

6 Claims, 4 Drawing Figures

ARRANGEMENT IN A SILO FOR BULK MATERIAL

BACKGROUND OF THE INVENTION

The present invention relates to an arrangement in a silo for bulk material, comprising a rotating agitator centrally arranged in the silo, said agitator consisting of a rotatable disc equipped with at least one rigid paddle which is mounted on the disc for rotation about an axis which is offset from the central axis of the disc, said paddle being resiliently advanced through the material in the silo in a more or less radially extending position depending on the relation between the force imparted to the paddle by actuating means and the reactive pressure from the contents of the silo.

For stirring the contents in silos for bulk material and for the discharge of the contents through an opening in the bottom it is known to provide rotatable agitators with fixed, rigid vanes or arms inside the silo, e.g. right above the bottom thereof. Such agitators are subjected to the danger of being overloaded when the resistance from the goods in the silo becomes very large.

Therefore, also agitators with resilient paddles have been developed. Thus, from Norwegian Patent Specification No. 101,986 there is known a rotating agitator with a rigid paddle mounted for resilient pivoting motion about an axis which is offset from the central axis of the agitator, a hood substantially covering the paddle in its inner or swung-in position. The paddle may assume several positions between the inner position and the fully extended or swung-out position in which it operates in the zone between the circumference of the hood and the walls of the silo. The reactive moment which the bulk material imparts to the paddle when the latter is in a given partly extended position, will be relatively large. The actuating means effecting the pivoting of the paddle towards an extended position must therefore be dimensioned for a moment-exerting reactive force which is proportional to the length of the paddle and the reactive pressure from the contents of the silo. Besides, the actuating means according to the patent specification is arranged inside the hood above the paddle. This complicates the access to the actuating means for adjustment, inspection, maintenance and repair, since the silo must then be completely emptied for its contents.

SUMMARY OF THE INVENTION

The object of the present invention is to eliminate the above-mentioned disadvantages. This is achieved in that the arm is pivotally mounted as a lever having two arms, the paddle generally taking the form of an arc having a radius of curvature substantially corresponding to the distance of the axis of rotation of the disc from the pivot of the paddle.

A substantially ineffective position of the paddle may thereby be achieved without any hood, as the paddle can be pivoted to a position in which it will follow a circular arc about the axis of rotation of the disc. In extended position the paddle will extend partly right to the wall of the silo and partly beyond the pivot point on the disc and inwardly towards the axis of rotation.

In the fully extended position the paddle will consequently sweep practically over the entire bottom of the silo with a maximum digging or agitating effect. In its fully swung-in position it will be advanced through the material with a minimum agitating effect.

Preferred embodiments of the invention will be described in the following, reference being had to the drawings.

DETAILED DESCRIPTION OF THE PREFERRED EMBODIMENT

Figure 2:
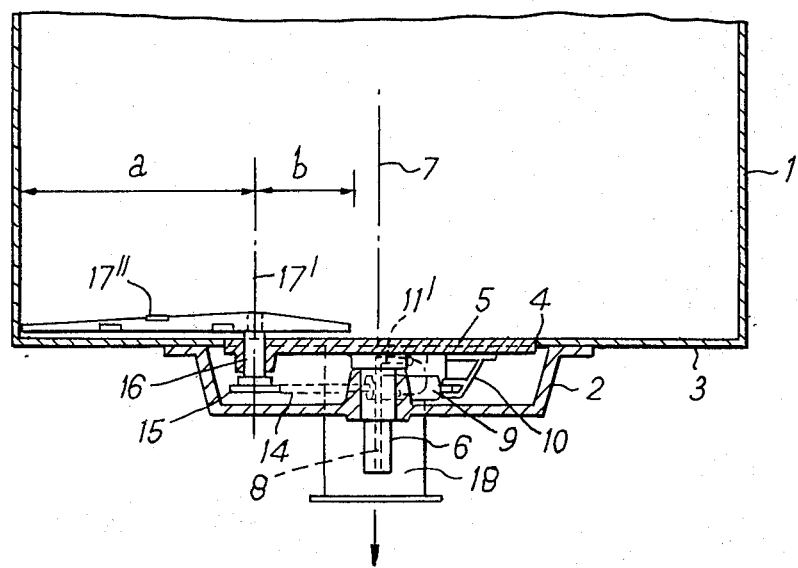
FIG. 2 is a vertical sectional view of the lower part of the silo, comprising the first embodiment of the invention.

In the drawing, 1 designates the silo itself. 2 designates a supporting bracket affixed to the underside of the floor 3 of the silo. Centrally in the floor 3 of the silo there is a circular shaped opening 4, wherein a circular disc 5 can rotate. The disc 5 is at its underside attached to a shaft 6 extending along the central axis 7 of the silo and through the supporting bracket 2 which serves as an axial and radial mounting of the shaft 6. The shaft 6 is rotated by means of not shown drive means and has a central bore 8 which in itself serves as or contains a conduit for drive fluid for communication between a stationary not shown source or pressurized fluid and a hydraulic cylinder 9 affixed to the underside of the disc 5 by means of a bracket 10. A transition conduit 11 leads from the cylinder 9, said transition conduit communicating with the central bore 8 in the shaft 6 through a second radial bore 11' in the upper portion of the shaft. The cylinder 9 is operated by hydraulic liquid from the not shown source of hydraulic fluid and the hydraulic liquid controls a piston 12 in the cylinder 9, said piston 12 being attached to a piston rod 13 which through a chain 14 is connected to a chain wheel 15 on the lower end of a shaft 16, which is offset from the axis 7 of the silo. The shaft 16 is rotatably mounted in the disc 5 and carries at its upper end an agitator arm or paddle 17 which takes the form of a ring segment or an arc, the radius of curvature of which approximately corresponds to the radius of the disc 5 at the pivoting point of the paddle 17. Further, the paddle 17 is designed as a lever with two arms, said paddle being pivotable on the shaft 16. In FIG. 2 the lengths a and b of the two arms are indicated. The ratio between the lengths of the arms a and b may be freely chosen depending on the other dimensions of the silo 1 and the disc 5, but it is desirable to make b so long that the difference between a and b will not be too large. The radius of curvature of the paddle 17 should substantially correspond to the distance of the central axis 7 of the silo from the pivot axis 17' of the paddle.

Figure 1:
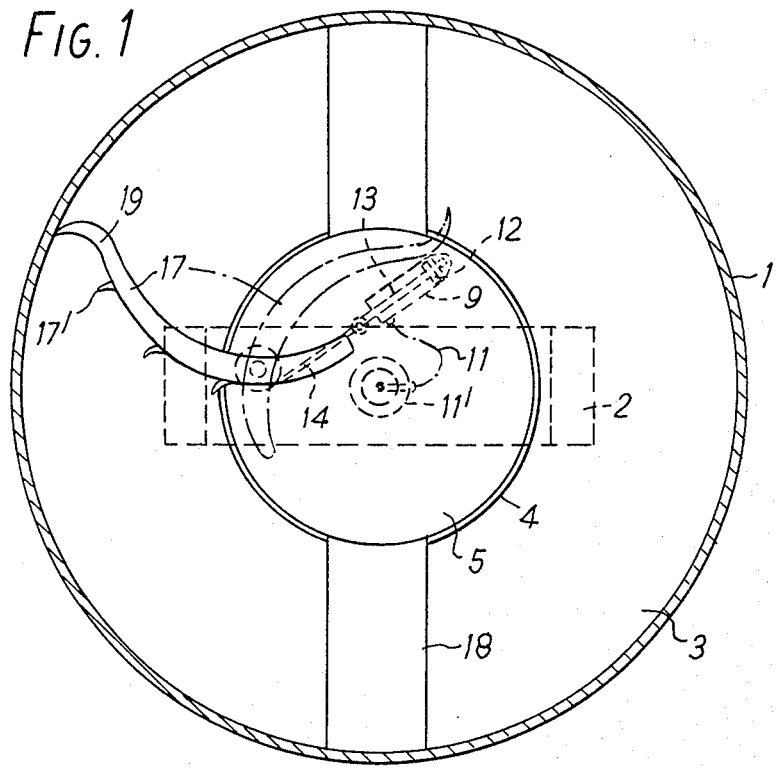
FIG. 1 is a horizontal sectional view of the silo, showing a first embodiment of the invention.

In FIG. 1 two positions of the agitator arm or paddle 17 are shown. The position of the paddle 17 shown in full lines will exist when the piston 12 is in the position shown in FIG. 1, this being the case when the goods in the silo exert a reactive moment less than the moment due to the hydraulic pressure in the cylinder 9 on the paddle 17. This fully extended or swung-out position of the paddle gives a maximum agitating effect when the disc 5 is rotating, and in this position both the lever arms a and b are influenced by the material in the silo. Thus, by the agitating effect of the paddle 17 the bulk material in the silo 1 will pour out through an outlet opening 18 in the floor 3 of the silo. For further increase of the digging or agitating effect the paddle 17 is equipped with a series of studs or hooks 17'' as well as an arced end portion 19, which is bent in the opposite direction of the main portion of the arm.

If the material in the silo is densely packed, the reactive moment on the agitator arm or paddle 17 will increase and the paddle 17 will then swing so much towards the fully swung-in position shown in dash-dotted lines in FIG. 1 that the reactive moment on the agitator arm is in balance with the moment for the cylinder 9. In the position shown in dash-dotted lines in FIG. 1 the paddle 17 will exert a minimum agitating effect, said paddle then being dragged through the contents of the silo. Between these two extreme positions the angular position of the arm will determine the extent of the agitating effect exerted by the paddle, a maximum agitating effect being exerted when the paddle extends transversely to the direction of movement and a minimum agitating effect being exerted when the paddle extends in the direction of movement.

As the source of hydraulic drive fluid is arranged outside the silo, the pressure in the cylinder 9 may be adapted to the type and the quantity of the material housed in the silo. The pressure may, however, be provided by means which are designed for relatively low pressures, since the reactive forces resulting from the contents of the silo and exerted on each of the arms a and b of the paddle, will balance each other to a certain degree. Besides, the two-armed design of the paddle entails that the arm in its fully swung-out position sweeps across the entire bottom of the silo without leaving any uninfluenced zone at the central portion of the bottom. In the embodiment shown the portion b of the paddle 17 is not extended fully into the center of the disc, and in this case it may be appropriate to provide a central vane means on the central portion of the disc. This vane means may then effect a displacement of the part of the contents falling down on the center portion of the disc, out into the zone in which the paddle is operating.

The shown embodiment may be modified within wide limits without exceeding the scope of the invention. Thus, the drive fluid for the cylinder motion may be air or some other suitable fluid. Instead of a hydraulic cylinder other forms of power accumulators may be used, e.g. springs. Besides, the moment on the shaft 16 of the agitator arm may be transmitted from the power accumulators via a wire, a gear wheel transmission or in any similar manner.

By providing two or more agitator arms or paddles on the disc an even more effective agitating effect may be achieved. From the side of the supporting bracket there is access to the paddle actuating means provided under the disc 5, and this access does not depend upon a shut-down of the operation or an emptying of the contents of the silo. Starting-up, running-in and service will therefore be very simplified with the arrangement according to the invention.

The principle of the invention can also be used on one or more paddles provided on different discs which are arranged at different levels above the bottom of the silo. As the paddles are made to sweep across practically the entire horizontal surface of the silo, the possibility of the contents of the silo being jammed between the discs is reduced. However, in the additional discs positioned above each other, the same possibilities of access to the actuating means are not present, as in the arrangement adjacent the bottom of the silo.

Figure 3:
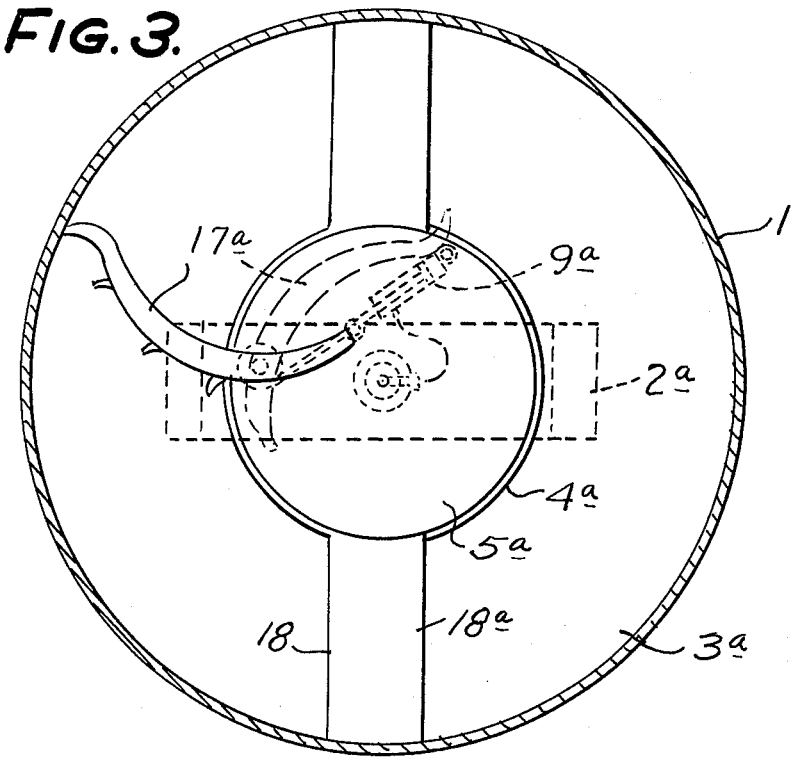
FIG. 3 is a horizontal sectional view of the silo, showing a second embodiment of the invention, and, FIG. 4 is a vertical sectional view of the lower part of the silo comprising the second embodiment of the invention.
Figure 4:
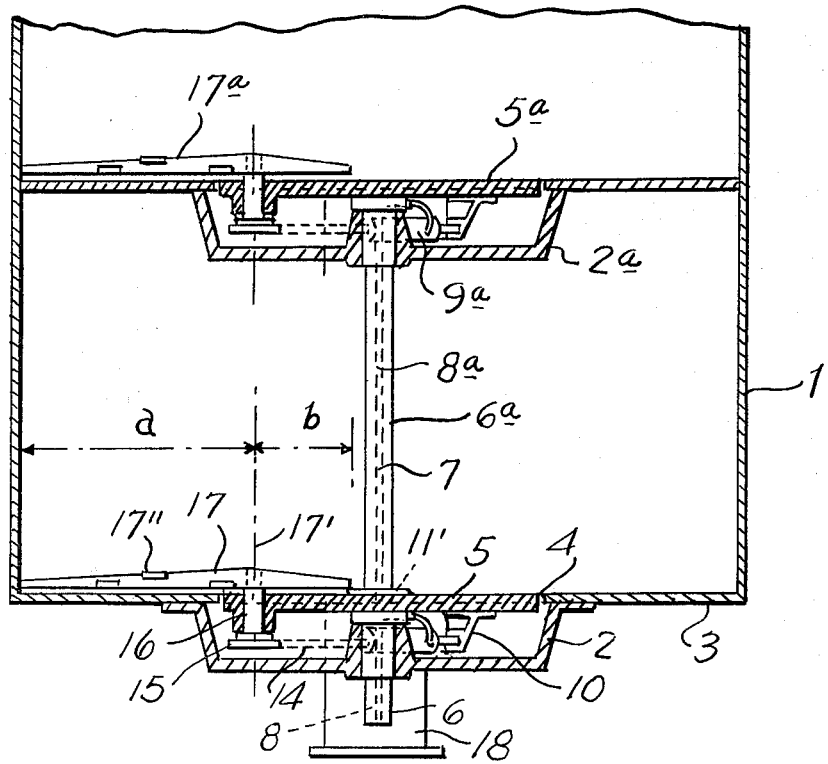

FIGS. 3 and 4 show another embodiment of the invention, whereas a first paddle 17 in the same manner as described above in connection with the first embodiment of FIGS. 1 and 2, is provided on a lower circular disc 5 adjacent the floor 3 of the silo 1. A second paddle 17a is provided on another circular disc 5a arranged at a level above the first circular disc 5, the upper disc 5a being attached to a shaft 6a, which is an extension of the shaft 6 described above in connection with the first embodiment of FIGS. 1 and 2. The shaft 6a and the upper disc 5a affixed thereto are driven by the same drive means which are provided for the lower shaft 6 as explained above. At the same level as the upper disc 5a a second upper floor 3a is provided. Centrally in the upper floor 3a of the silo 1 there is a circular opening 4a, wherein the circular disc 5a can rotate. In FIGS. 3 and 4 2a designates a cover clamped to the bottom side of the upper rotating disc 5a and the shaft 6a for rotating therewith. The disc 5a and the cover 2a form the housing of actuating means which tend to swing the upper paddle 17a towards its radially extending position against the reaction pressure from the contents of the silo. The actuating means comprise a hydraulic cylinder 9a affixed to the bottom surface of the disc 5a, and the cylinder 9a is operated hydraulically in the same manner as described in connection with the first embodiment of FIGS. 1 and 2, pressurized fluid being supplied thorugh a bore 8a in the shaft 6a.

In the upper floor 3a of the silo 1 there is provided an outlet opening 18a through which the bulk material above the upper floor 3a of the silo will pour out by the agitating effect of the upper paddle 17a. The loosened material which falls through the opening 18a, will, if the opening 18a is positioned right above the lower outlet opening 18 in the floor 3 of the silo, leave the silo therethrough, provided the quantity of material which is held by the lower floor 3, is negligible. If the two outlet openings 18a and 18 are displaced 90°relative to each other the material from the upper part of the silo will at first be collected on the lower floor 3 of the silo for further agitation by the lower paddle 17 before leaving the silo through the lower outlet opening 18.

As the upper and lower paddle 17 and 17a, respectively, are made to sweep across practically the entire horizontal surface of the silo, the possibility of the contents of the silo being jammed between the disc 5 and 5a is reduced. However, in the upper housing constituted by the upper disc 5a and the upper cover 2a the same possibilities of access to the actuating means as in the arrangement adjacent the bottom of the silo are not shown.

What I claim is:

1. In an arrangement in a silo for bulk material, a rotating agitator comprising a disc mounted adjacent the bottom of the silo for rotation about a vertical axis, and at least one rigid paddle means being shaped generally as an arc having a radius of curvature substantially corresponding to the distance of the axis of rotation of the disc from the pivot of the paddle, said paddle means being pivotally mounted as a two-armed lever on the disc for swinging motion about an axis which is offset from said vertical axis, both arms of the lever being fully exposed to the contents of the silo; and actuating means tending to swing said paddle towards its radially extending position against the reactive pressure from the contents of the silo.

2. Arrangement as claimed in claim 1, characterized in that the paddle (17) is provided with studs or hooks (17'') along the leading edge as viewed in the direction of advancement for improving tearing off of the bulk material in the silo.

3. Arrangement as claimed in claim 1, characterized in that the actuating means (9, 14, 15) effecting the outward swinging of the paddle (17) is arranged below the disc (5).

4. Arrangement is claimed in claim 3, characterized in that the actuating means consists of a hydraulic cylinder (9) which is in power transmitting connection with a rotatable shaft (16) on which the paddle is mounted.

5. Arrangement as claimed in claim 4, characterized in that the shaft (6) rotating the disc (5) has a bore (8), which either in itself serves as or contains a conduit for pressurized fluid for communication between a stationary source of pressurized fluid and the hydraulic cylinder (9).

6. Arrangement as claimed in claim 1, characterized in that two paddles (17) are arranged at different levels above the bottom of the silo.

* * * * *